Patented June 7, 1932

1,861,763

UNITED STATES PATENT OFFICE

GEORGE N. TERZIEV, OF SOLVAY, NEW YORK, ASSIGNOR TO THE SOLVAY PROCESS COMPANY, OF SYRACUSE, NEW YORK, A CORPORATION OF NEW YORK

PROCESS OF TREATING BRINE

No Drawing. Application filed May 13, 1931. Serial No. 537,223.

This invention relates in general to the purification of brines, and in particular to a process of substantially completely removing ammonia from electrolytic brines.

A principal object of this invention is the treatment of natural or artificial brines to render them substantially completely free of ammonia and/or ammonium compounds. While the invention relates particularly to the purification of brines to be used in electrolysis, it is also an object of this invention to treat brines for use in other arts, e. g. refrigeration. Other objects of the invention will in part be obvious and will in part appear hereinafter.

Natural brines frequently contain salts of calcium, magnesium, iron and ammonia and some free ammonia. In the purification of brine for the manufacture of caustic and chlorine and for other purposes, the calcium, magnesium and iron are usually removed by the addition of sodium carbonate, thus precipitating these elements as carbonates. It has also been proposed to treat brines, destined for use in electrolytic cells, with a mixture of caustic soda and sodium carbonate or with waste cell effluent containing a substantial quantity of caustic soda, for the purpose of setting free ammonia contained in the brine. However, the ammonia is but incompletely freed and removed from the solution by such treatment.

The disadvantages of these processes comprise the use of expensive reagents, introduction of harmful salts into the brine, undesirable dilution of the brine and the necessity of employing expensive processes to adjust the concentration of the purified brine, as well as those disadvantages which arise from incomplete removal of the ammonia from the treated brine.

It is known that the presence of ammonia and ammonium compounds in electrolytic brine is objectionable. The principal objection to the use of brines containing ammonia lies in the fact that upon electrolysis the ammonia present is transformed in part at least to nitrogen trichloride. This compound contaminates the chlorine produced in the cell. The presence of nitrogen trichloride in the chlorine is a source of some hazard owing to the unstable character of the compound. Further, expensive processes are necessary to remove this impurity from chlorine if a gas of high purity is required.

It has now been found that the disadvantages of the known methods of purifying brine may be overcome and the brine rendered substantially completely free of ammonia and placed in a condition for electrolysis by subjecting the brine to the process which is the subject of this invention.

According to the present invention brine which may have been previously freed by known methods of calcium, magnesium, iron, etc., is treated with a halogen, such as chlorine, bromine, or iodine, or with a hypohalogen salt or acid.

The reactions which take place when brine containing ammonia is subjected to the action of a halogen such as chlorine are more or less complex, but it has been found that in the absence of excess ammonium salts gaseous nitrogen is one of the decomposition products. The decomposition of ammonium salts and ammonia to yield gaseous nitrogen may very probably be represented by one or both of the reactions which are expressed by the following equations:

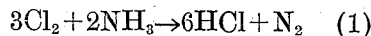
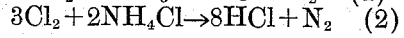

$$3Cl_2 + 2NH_3 \rightarrow 6HCl + N_2 \quad (1)$$
$$3Cl_2 + 2NH_4Cl \rightarrow 8HCl + N_2 \quad (2)$$

If the halogen is added in the form of a hypohalogen salt, such as sodium hypochlorite (NaOCl) the decomposition reactions may very probably be expressed by the following equations:

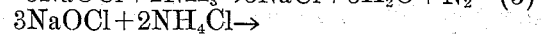
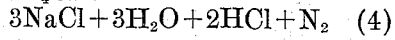

$$3NaOCl + 2NH_3 \rightarrow 3NaCl + 3H_2O + N_2 \quad (3)$$
$$3NaOCl + 2NH_4Cl \rightarrow 3NaCl + 3H_2O + 2HCl + N_2 \quad (4)$$

It is suspected that under certain conditions halogenation of the alkaline brine results in the formation, in addition to free nitrogen, of nitrogen compounds, such as mono-chloramine ($NH_2Cl$) which are substantially completely eliminated by subsequently heating and/or aerating the brine. Regardless of the nature of the reactions which bring about the decomposition of ammonia and/or ammonium compounds it has been found that the process herein described results in a brine substantially completely free of ammonia and/or ammonium compounds.

The halogenation of a brine containing ammonia can be carried out in any well known manner, such as by bubbling the halogen gas in elemental form through the brine, with or without agitation; or by subjecting the brine to counter-current flow with the gas; or by adding to the brine a hypohalogen compound, such as sodium hypobromite or hypobromic acid. The brine, which will usually be alkaline in reaction, is preferably subjected to the action of halogen in an amount in excess of the equivalent of the ammonia, free and combined, contained in the brine. The ammonia-free brine thus produced is then preferably treated to substantially completely eliminate the nitrogen and nitrogen compounds resulting from the decomposition of the ammonia and ammonium salts.

The nitrogen and nitrogen compounds may be substantially completely eliminated by aerating the brine by means of air or other gas which is chemically non-reactive with brine. Or the elimination of the nitrogen and nitrogen compounds may be accomplished by the use of heat or by the simultaneous or successive application of heat and aeration. As it is customary to employ in electrolytic cells brine having an acid reaction, the brine after aeration, if alkaline, may be neutralized or made slightly acidic by the addition of an acid, such as hydrochloric acid. Or the brine, after treatment with a halogen, may first be neutralized or acidified and then subjected to aeration and/or heating until the brine is substantially completely free of nitrogen and nitrogen compounds.

In the preferred modification of this process, brine is treated with an amount of a halogen, such as chlorine, bromine or iodine, in elemental form, substantially three times the equivalent of the ammonia, free and combined, contained therein, the halogenated brine aerated for a period of one-half to one hour or until it is completely free of nitrogen and nitrogen compounds and if necessary is treated with an amount of hydrochloric acid or other acid solution sufficient to render the ammonia-free brine neutral or slightly acid in reaction. If the initial concentration of ammonia and its salts in the brine is high, it is desirable to repeat the aeration process after the brine has been rendered neutral or acid as described. In this case, the first aeration period may be shortened, e. g. to 10–30 minutes, and the second and subsequent aeration prolonged for from one-half to two hours or longer as required. Successive operations of aerating and acidifying may be advantageously employed, in which case the final step may consist in adding an acid to make the brine neutral or slightly acid in reaction.

As an example of the preferred modification of this invention, 150 cubic meters of a brine, requiring .095 g. of chlorine per liter to substantially completely decompose the ammonia present therein, i. e., containing about 0.015 grams of ammonia as determined by analysis using the method below mentioned, is treated with about 100 lbs. of chlorine in elemental form and aerated for one-half hour. Any residual alkalinity is then neutralized by the addition of sufficient hydrochloric acid to render the brine neutral or slightly acid in reaction. The purified brine may be sent to the cells without further treatment.

In practicing the invention it is preferable to determine by analysis the amount of total ammonia, free and combined, contained in the brine in order to indicate the amount of halogen required to decompose the ammonia. A method of analysis for total ammonia which I have found satisfactory is that given by E. R. Allen in the Journal of Industrial and Engineering Chemistry, Volume VII, 1915, pages 521 to 529.

Since certain changes may be made in carrying out the above process without departing from the scope of the invention, it is intended that all matter contained in the above description shall be interpreted as illustrative and not in a limiting sense.

The improved process of the present invention enables a considerable saving to be effected in the purification of electrolytic brines, inasmuch as the halogenation process of this invention eliminates the use of caustic treatment for ammonia removal and subsequent evaporation processes. Further, the purified brine resulting from the process claimed herein requires no concentration but may be used in electrolytic cells without subsequent treatment. The purified brine of this process is substantially completely free of ammonia and ammonium compounds, consequently chlorine, prepared by the electrolysis of brine which has been purified by the process of this invention, will be found uncontaminated by nitrogen trichloride, and the hazards which arise from the presence of this impurity in chlorine will be avoided.

In the following claims the term "ammonia" is intended to include both free and combined ammonia.

I claim:

1. In a process of purifying brine containing ammonia, the step which comprises treating the brine with a halogen to decompose substantially all the ammonia present therein.

2. In a process of purifying brine containing ammonia, the steps which comprise subjecting the brine to the action of a halogen and treating said brine to substantially completely eliminate nitrogen and nitrogen compounds therefrom.

3. In a process of purifying brine containing ammonia, the steps which comprise subjecting the brine to the action of a halogen in elemental form and treating said brine to substantially completely eliminate nitrogen and nitrogen compounds therefrom.

4. In a process of purifying brine containing ammonia, the steps which comprise treating the brine with a halogen and aerating the halogenated brine for a period of time sufficient to substantially completely remove nitrogen and nitrogen compounds therefrom.

5. In a process of purifying brine containing ammonia, the steps which comprise treating the brine with a halogen in elemental form in excess of that equivalent to the ammonia content thereof, aerating the halogenated brine for a period of time sufficient to substantially completely remove nitrogen and nitrogen compounds therefrom.

6. In a process of purifying brine containing ammonia, the step which comprises treating the brine with chlorine to decompose substantially all the ammonia present therein.

7. In a process of purifying brine containing ammonia, the steps of subjecting the brine to the action of chlorine, and treating the chlorinated brine to substantially completely eliminate nitrogen and nitrogen compounds therefrom.

8. In a process of purifying brine containing ammonia, the steps of subjecting the brine to the action of chlorine in elemental form, and treating the chlorinated brine to substantially completely eliminate nitrogen and nitrogen compounds therefrom.

9. In a process of purifying brine containing ammonia, the steps which comprise treating the brine with chlorine in excess of that equivalent to the ammonia content thereof, and aerating the chlorinated brine for a period of time sufficient to substantially completely remove nitrogen and nitrogen compounds therefrom.

10. In a process of purifying brine containing ammonia, the steps which comprise treating the brine with chlorine in an amount substantially three times the equivalent of the ammonia content thereof, and aerating the chlorinated brine for a period of time sufficient to substantially completely remove nitrogen and nitrogen compounds therefrom.

11. In a process of purifying brine containing ammonia, the steps which comprise treating the brine with chlorine in elemental form in excess of the ammonia content thereof, and aerating the chlorinated brine for a period of time sufficient to substantially completely remove nitrogen and nitrogen compounds therefrom.

12. In a process of purifying brine containing ammonia, the steps which comprise treating the brine with chlorine in elemental form in an amount substantially three times the equivalent of the ammonia content thereof, aerating the chlorinated brine for a period of time not exceeding two hours to substantially completely remove nitrogen and nitrogen compounds therefrom and treating the aerated brine with hydrochloric acid in an amount sufficient to render said brine neutral or slightly acidic.

13. In a process of purifying brine containing ammonia, the steps of subjecting the brine to the action of a hypohalogen compound and thereafter treating the brine to substantially completely eliminate nitrogen and nitrogen compounds therefrom.

14. In a process of purifying brine containing ammonia, the steps of subjecting the brine to the action of a hypobromite and thereafter treating the brine to substantially completely eliminate nitrogen and nitrogen compounds therefrom.

GEORGE N. TERZIEV.